United States Patent [19]
Becker

[11] Patent Number: 5,666,988
[45] Date of Patent: Sep. 16, 1997

[54] THROTTLE SHAFT AND PLATE CONSTRUCTION

[75] Inventor: Christine Cynthia Becker, Royal Oak, Mich.

[73] Assignee: Siemens Electric Limited, Windsor, Canada

[21] Appl. No.: 596,017

[22] Filed: Feb. 6, 1996

[51] Int. Cl.$^6$ .................. F16K 1/22; F16K 1/48
[52] U.S. Cl. .................. 137/15; 29/428; 29/890.124; 29/890.127; 29/DIG. 24; 137/315; 251/308; 403/242; 403/270
[58] Field of Search .................. 29/890.12, 890.124, 29/890.127, 428, DIG. 21, DIG. 24; 137/15, 315; 251/305, 308; 403/242, 270

[56] References Cited

U.S. PATENT DOCUMENTS

| | | | |
|---|---|---|---|
| 1,841,695 | 1/1932 | Anderson | 251/308 |
| 2,694,515 | 11/1954 | Green | 251/308 |
| 2,753,147 | 7/1956 | Welge | 251/305 |
| 3,111,300 | 11/1963 | Boone, Sr. | 251/308 |
| 3,862,740 | 1/1975 | Gallagher et al. | 251/305 |
| 4,117,261 | 9/1978 | Blevins et al. | 403/242 |
| 4,176,823 | 12/1979 | Gliatas | 251/308 |
| 5,275,375 | 1/1994 | Semence | 251/308 |
| 5,499,947 | 3/1996 | Tauber | 29/890.124 |

*Primary Examiner*—George L. Walton
*Attorney, Agent, or Firm*—Russel C. Wells

[57] ABSTRACT

A throttle plate-throttle shaft construction is formed by molding both components from composite plastic, the shaft having integral bosses which are received in holes formed in the throttle plate. The bosses are ultrasonically staked to lock the throttle plate onto the throttle shaft.

2 Claims, 1 Drawing Sheet

THROTTLE SHAFT AND PLATE CONSTRUCTION

BACKGROUND OF THE INVENTION

This invention concerns a throttle valve construction for automotive engines. Throttle valves typically comprise a throttle plate disc attached to a throttle shaft mounted extending across the bore of a throttle body receiving inlet air flow from an intake manifold.

The throttle shaft is rotated to control the air flow by variably restricting the throttle bore with the throttle plate by rotating the throttle shaft.

Conventional practice has been to construct both the throttle blade and shaft of metal, attaching the plate to the shaft with small screws passing through holes in the plate and received into small threaded holes in the shaft.

These small screws can become loose and get drawn into the engine, creating severe mechanical problems. The use of separate fasteners also increases manufacturing costs.

It is the object of the present invention to provide an improved throttle shaft and plate construction which eliminates separate fasteners such as the small screws described above.

SUMMARY OF THE INVENTION

The above object and others which will become apparent upon a reading of the following specification and claims are achieved by a throttle valve construction in which the throttle shaft component is molded from a plastic composite material, and is formed with a flattened side against which one side of the throttle plate is held. One or more bosses integrally formed projecting from the flattened side of the throttle shaft, are received into corresponding holes in the throttle plate which is also molded from a composite plastic.

The bosses project above the throttle plate and are heat staked, preferably ultrasonically, to securely attach the plate to the throttle shaft.

DETAILED DESCRIPTION

Figure 1:
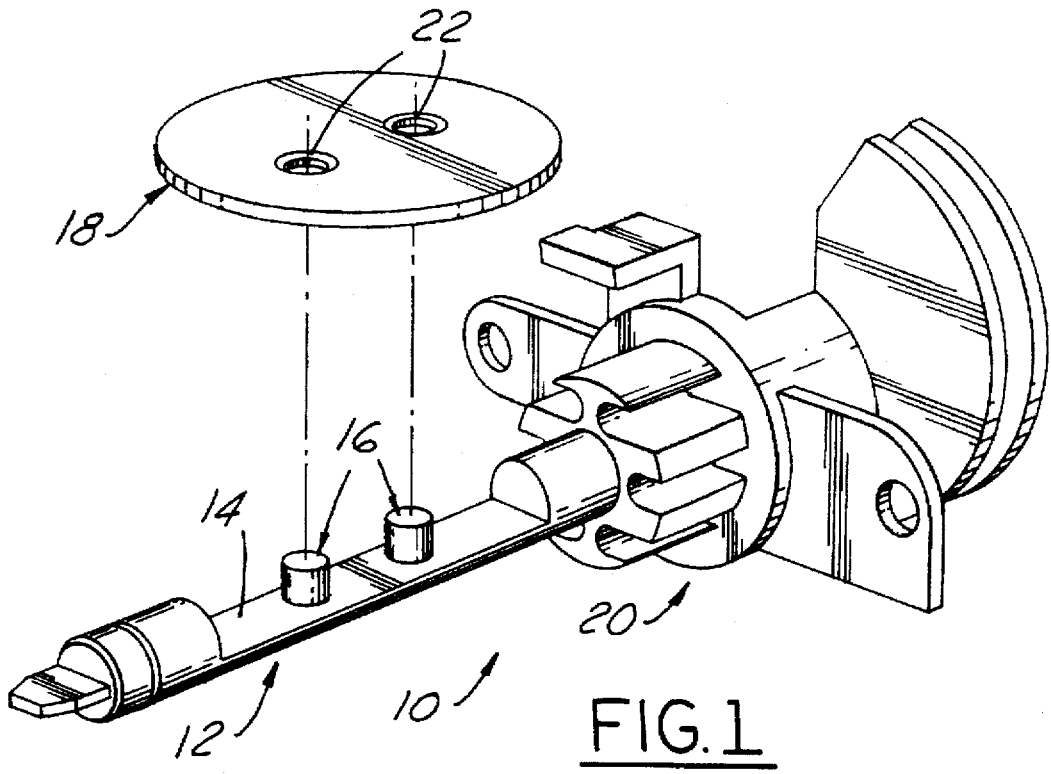
FIG. 1 is an exploded perspective view of a throttle shaft component and a throttle plate to be assembled thereto.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, a molded throttle shaft component 10 is shown, which includes the throttle shaft 12 itself. The shaft 12 is integrally formed with other features of the throttle shaft component 10, such as the spring retainer and lever indicated generally at 20. The throttle shaft component maybe formed by injection molding of the part from a composite plastic material.

The plastic material should be selected so as to allow an efficient ultrasonic staking operation as described herein. Suitable semicrystalline materials include LCP (liquid crystal polymers) or polyphenylene (PPS) filled with glass or mineral fibers.

The throttle shaft 12 has a recess formed on one side to create a blade mounting flat 14, from which projects perpendicularly a pair of spaced apart cylindrical bosses 16, molded integrally with the shaft component 10. The bosses 16 should be of a height low enough as to lie within the diameter of the throttle shaft 12 thereby allowing assembly by insertion of the shaft 12 through an opening in the throttle body (not shown) in which the throttle shaft component 10 is installed prior to heat staking of the bosses 16.

The throttle plate 18 comprises a disc also molded of a composite plastic material, such as the PPS or LCP materials described above, and having a pair of spaced apart holes 22 formed therein. The holes 22 are spaced apart and sized to receive the bosses 16 when the plate 18 is placed on the surface 14.

Figure 2:
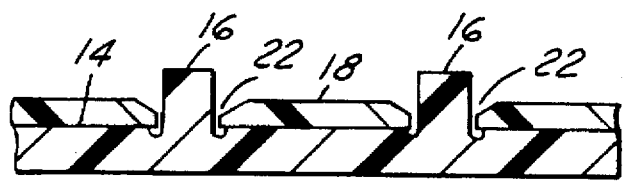
FIG. 2 is an enlarged fragmentary view of a lengthwise section taken through the assembled throttle shaft and plate prior to heat staking of the bosses formed on the throttle shaft.

The holes 22 may be chamfered on the side of the throttle plate 16 away from the throttle shaft 12, as shown in FIG. 2, to improve the strength of the connection produced when the bosses 16 are ultrasonically staked.

A clearance space between each of the bosses 16 and a respective one of the holes 22 allows alignment of the throttle plate 18 as necessary within the throttle body air induction bore prior to the staking operation.

Figure 3:
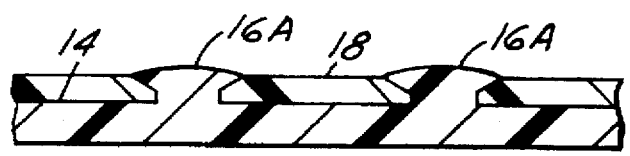
FIG. 3 is an enlarged fragmentary view of a lengthwise section taken through the assembled throttle shaft and plate, showing the bosses formed on the shaft heat staked to lock the plate onto the shaft.

When proper alignment has been achieved, the bosses 16 are heat staked ultrasonically causing portions thereof to melt and reflow to completely fill the chamfered hole sides, including the clearance gap and the chamfer space as shown in FIG. 3. Upon cooling, the staked head 16A of the bosses 16 securely locks the throttle plate 18 onto the throttle shaft 12.

Conventional ultrasonic staking techniques and equipment can be employed in the process and details of this technique and equipment are not set forth herein inasmuch as these are well known in the art.

Suffice it to say that a horn is used to engage the head 16A of each boss 16, and mechanical vibrations set up in the horn are transmitted into the head 16A of the boss 16 causing localized melting and reformation as described above.

The chamfering allows smooth orientation of the fibers in extending outwardly to the larger diameter head 16A formed by the staking if the entire boss is completely remelted, such that this technique is a preferred way of conducting the staking operation. A less smooth orientation results if only the top of the boss is remelted during staking. A smooth fiber orientation as well as the increased area of the chamfer provides greater strength in the head of the bosses.

Figure 4:
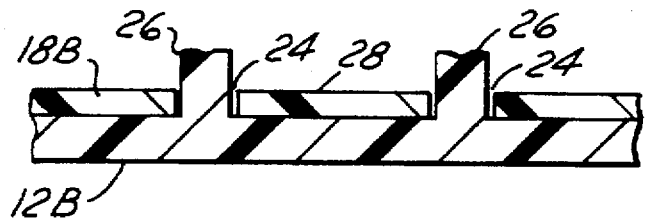
FIGS. 4 and 5 are fragmentary lengthwise sectional views of the throttle plate and shaft connected by an alternate form of heat staked connection.
Figure 5:
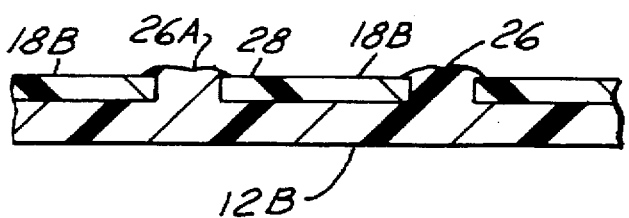

Straight holes 24 may also be used for some applications as shown in FIGS. 4 and 5.

Ultrasonic staking of the bosses 26 melts the material comprising the head and lower portions of the boss to completely fill the clearance space and flow over the adjacent surface 28 of the throttle disc 18B to lock the same to the throttle shaft 12B, as before.

Accordingly, a secure high strength locking attachment of the throttle plate to the throttle shaft is provided without separate fasteners to achieve the object of the present invention.

I claim:

1. A throttle shaft-throttle plate assembly comprising:

a throttle shaft component of a plastic composite material having a throttle shaft portion formed with a flat surface, a pair of spaced apart bosses projecting from said surface and lying within the circumferential surface of said throttle shaft portion;

a throttle plate, comprising a disc of a plastic composite material formed with a pair of spaced apart holes adapted to overlie said pair of bosses, said throttle plate having one side positioned abutting against said throttle shaft surface with said bosses projecting through said holes, said holes chamfered from said other side of throttle plate;

said bosses heat staked over said throttle plate and flowing plastic composite material from said bosses into said chamfered surfaces to secure said throttle plate to said throttle shaft.

2. A method for assembling a throttle shaft and a throttle plate assembly comprising the steps of:

molding a throttle shaft component of a plastic composite material;

forming a flat surface on a portion of the throttle shaft;

providing a pair of molded of spaced apart bosses projecting from the flat surface and having a height lying within the circumferential surface of the throttle shaft portion;

providing a throttle plate disc of a plastic composite material;

said throttle plate disc having a pair of spaced apart holes in the disc adapted to overlie the pair of bosses on the flat surface;

chamfering the perimeter of each of the holes on one side of the disc;

positioning the disc with the other side abutting against the flat surface with the bosses projecting through the holes, and then heat staking the bosses over the throttle plate and flowing some of the plastic composite material from the bosses into the chamfered surfaces to secure the disc to the throttle shaft.

* * * * *